US010055638B2

(12) United States Patent
Takeshima (10) Patent No.: US 10,055,638 B2
(45) Date of Patent: Aug. 21, 2018

(54) IMAGE PROCESSING DEVICE, IMAGING DEVICE, MICROSCOPE DEVICE, IMAGE PROCESSING METHOD, AND IMAGE PROCESSING PROGRAM

(71) Applicant: HAMAMATSU PHOTONICS K.K., Hamamatsu-shi, Shizuoka (JP)

(72) Inventor: Tomochika Takeshima, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 591 days.

(21) Appl. No.: 13/726,916

(22) Filed: Dec. 26, 2012

(65) Prior Publication Data
US 2013/0169787 A1 Jul. 4, 2013

Related U.S. Application Data

(60) Provisional application No. 61/670,264, filed on Jul. 11, 2012.

(30) Foreign Application Priority Data

Dec. 28, 2011 (JP) .................................. 2011-288390

(51) Int. Cl.
*G06K 9/68* (2006.01)
*G06K 9/46* (2006.01)
(Continued)

(52) U.S. Cl.
CPC ................................ *G06K 9/00147* (2013.01)

(58) Field of Classification Search
CPC ........ G06K 9/00147; G06K 9/68; G06K 9/00; G06K 9/4647; G06K 9/36; G06K 9/46; H04N 19/00545; G01N 15/1429
(Continued)

(56) References Cited

U.S. PATENT DOCUMENTS

2010/0329569 A1* 12/2010 Ishikawa et al. ............. 382/195
2011/0142350 A1* 6/2011 Tang .................... G06K 9/4647
382/195
(Continued)

FOREIGN PATENT DOCUMENTS

CN 101268935 9/2008
CN 101766476 7/2010
(Continued)

OTHER PUBLICATIONS

English-language translation of International Preliminary Report on Patentability (IPRP) dated Jul. 10, 2014 that issued in WO Patent Application No. PCT/JP2012/072222.
(Continued)

*Primary Examiner* — Gims S Philippe
*Assistant Examiner* — Albert Kir
(74) *Attorney, Agent, or Firm* — Drinker Biddle & Reath LLP (57) ABSTRACT

The image processing device 10 includes a template preparation unit 15 for preparing, from a template included in pixels of M rows and M columns (M is an integer not less than 3) corresponding to a molecular model, a partial template corresponding to a shape for which a shape of the molecular model is divided, an evaluation value calculation unit 17 for evaluating, in the optical image, by use of the partial template, matching between the optical image and the partial template to calculate an evaluation value for every plurality of the attention pixels, and a molecular location identification unit 18 for identifying the molecular location in the optical image based on the evaluation value.

4 Claims, 10 Drawing Sheets

(51) Int. Cl.
*G06K 9/00* (2006.01)
*G06K 9/36* (2006.01)

(58) Field of Classification Search
USPC ............ 382/195, 128, 103, 218; 348/46, 79; 375/240.15
See application file for complete search history.

(56) References Cited

U.S. PATENT DOCUMENTS

2011/0284767 A1   11/2011   Wolleschensky et al.
2013/0121417 A1*   5/2013   Chong et al. ............ 375/240.15

FOREIGN PATENT DOCUMENTS

| | | |
|---|---|---|
| CN | 102288589 | 12/2011 |
| JP | 2007-510199 | 4/2007 |
| JP | 2011-8713 | 1/2011 |
| WO | 2010/060515 | 6/2010 |

OTHER PUBLICATIONS

Susan Cox, et al., "Bayesian localization microscopy reveals nanoscale podosome dynamics", Nature Methods, Feb. 2012, pp. 195-200, vol. 9, No. 2.

Stephanie Fullerton, et al., "Camera Simulation Engine Enables Efficient System Optimization for Super-Resolution Imaging", Proc. SPIE, 8228.

Seamus J. Holden et al., "DAOSTORM: an algorithm for high-density super-resolution microscopy", Nature Methods, Apr. 2011, pp. 279-280, vol. 8, No. 4.

Fang Huang et al., "Simultaneous multiple-emitter fitting for single molecule super-resolution imaging", Biomedical Optics Express, May 1, 2011, pp. 1377-1393, vol. 2, No. 5.

Tingwei Quan et al., "High-density localization of active molecules using Structured Sparse Model and Bayesian Information Criterion", Optics Express, Aug. 29, 2011, pp. 16963-16974, vol. 19, No. 18.

Shigeo Watanabe et al., "Localization of High-Density Fluorophores using Wedged Template Matching", Focus on Microscopy, Apr. 3, 2012.

Yan Zhi-dan et al., "A High Precision Algorithm for Fluorescence Single Molecule Localization with Nanometer Accuracy", Nanotechnology and Precision Engineering, vol. 8, No. 5, Sep. 30, 2010, p. 394-p. 400.

\* cited by examiner

IMAGE PROCESSING DEVICE, IMAGING DEVICE, MICROSCOPE DEVICE, IMAGE PROCESSING METHOD, AND IMAGE PROCESSING PROGRAM

CROSS-REFERENCE TO RELATED APPLICATION

This application claims priority to Provisional Application Ser. No. 61/670,264 filed on Jul. 11, 2012 and Japanese Patent Application No. 2011-288390 filed on Dec. 28, 2011, which is hereby incorporated by reference in its entirety.

BACKGROUND OF THE INVENTION

1. Field of the Invention

The present invention relates to an image processing device, imaging device, microscope device, image processing method, and image processing program for identifying a molecular location from an image picture of a sample.

2. Related Background Art

Conventionally, it has been tried to image light from a sample containing fluorescent molecules or the like, and identify the location of the molecules such as fluorescent molecules by means of image data accordingly obtained. For example, the following Non Patent Literature 1 discloses a method for preparing a super-resolution image from an optical image of a sample. In this method, a pixel having the maximum luminance value among the pixels composing an optical image is identified as a candidate molecule, and after fitting a luminance distribution of model molecules to the image, and then subtracting a fitted model molecule luminance distribution from the image, the above-described candidate molecule is stored. Then, for the image after subtraction, identification of a candidate molecule, fitting, subtraction of a luminance distribution from an image, and storing of the candidate molecule is repeated, and a super-resolution image is generated based on the stored candidate molecules.

Non Patent Literature 1: Seamus J Holden, Stephan Uphoff & Achillefs N Kapanidis, "DAOSTORM: an algorithm for high density super-resolution microscopy," Nature Methods, Vol. 8, No. 4, April 2011

SUMMARY OF THE INVENTION

However, the method described in Non Patent Literature 1 described above is applicable when a plurality of molecules are distant from each other, while when a plurality of molecules are at close distance from each other, an optical image is generated with light from the respective molecules overlapped, and thus in the method for identifying a candidate molecule based on the luminance value, it is difficult to distinguish a plurality of molecules separately. Alternatively, a plurality of molecules may be misidentified as a single molecule.

Therefore, the present invention has been made in view of such problems, and it is an object thereof to provide an image processing device, imaging device, microscope device, image processing method, and image processing program capable of identifying a plurality of molecules with high accuracy.

In order to solve the above-described problems, one aspect of an image processing device of the present invention is an image processing device for identifying a molecular location based on an image picture of a sample obtained by an imaging element, and includes a template preparing means for preparing, from a template included in pixels of M rows and M columns (M is an integer not less than 3) corresponding to a molecular model, a partial template corresponding to a shape for which a shape of the molecular model is divided into a predetermined ratio, an evaluation value calculating means for evaluating, in the image picture, by use of the partial template corresponding to shapes rotated by a predetermined angle each about a selected attention pixel, matching between the image picture and the partial template to calculate an evaluation value for every plurality of the attention pixels, and a molecular location identifying means for identifying the molecular location in the image picture based on the evaluation value calculated for a plurality of the attention pixels in the image picture.

Alternatively, one aspect of an imaging device of the present invention includes the foregoing image processing device, and an imaging element for obtaining the image picture.

Alternatively, one aspect of a microscope device of the present invention includes the foregoing image processing device, an imaging element for obtaining the image picture, and an optical system for generating an image of the sample for the imaging element.

Alternatively, one aspect of an image processing method of the present invention is an image processing method for identifying a molecular location based on an image picture of a sample obtained by an imaging element, and includes a template preparing step of an image processing device preparing, from a template included in pixels of M rows and M columns (M is an integer not less than 3) corresponding to a molecular model, a partial template corresponding to a shape for which a shape of the molecular model is divided into a predetermined ratio, an evaluation value calculating step of the image processing device evaluating, in the image picture, by use of the partial template corresponding to shapes rotated by a predetermined angle each about a selected attention pixel, matching between the image picture and the partial template to calculate an evaluation value for every plurality of the attention pixels, and a molecular location identifying step of the image processing device identifying the molecular location in the image picture based on the evaluation value calculated for a plurality of the attention pixels in the image picture.

Alternatively, one aspect of an image processing program of the present invention is an image processing program for identifying a molecular location based on an image picture of a sample obtained by an imaging element, and causes a computer to function as a template preparing means for preparing, from a template included in pixels of M rows and M columns (M is an integer not less than 3) corresponding to a molecular model, a partial template corresponding to a shape for which a shape of the molecular model is divided into a predetermined ratio, an evaluation value calculating means for evaluating, in the image picture, by use of the partial template corresponding to shapes rotated by a predetermined angle each about a selected attention pixel, matching between the image picture and the partial template to calculate an evaluation value for every plurality of the attention pixels, and a molecular location identifying means for identifying the molecular location in the image picture based on the evaluation value calculated for a plurality of the attention pixels in the image picture.

According to such an image processing device, imaging device, microscope device, image processing method, and image processing program, a partial template divided from a template included in pixels of M rows and M columns is prepared, and by use of a partial template corresponding to a shape rotated about an attention pixel selected from an image picture, matching between the partial template and image picture is evaluated, and a molecular location is identified based on the obtained evaluation value. Accordingly, a molecular image distributed about an attention pixel can be identified with high accuracy by matching the molecular image with a template in a divided pixel region even when a part of the molecular image overlaps another molecular image.

DESCRIPTION OF THE PREFERRED EMBODIMENTS

Hereinafter, preferred embodiments of an image processing device, imaging device, microscope device, image processing method, and image processing program according to the present invention will be described in detail with reference to the drawings. Also, the same or corresponding parts will be denoted with the same reference signs in the description of the drawings, and overlapping description will be omitted.

Figure 1:
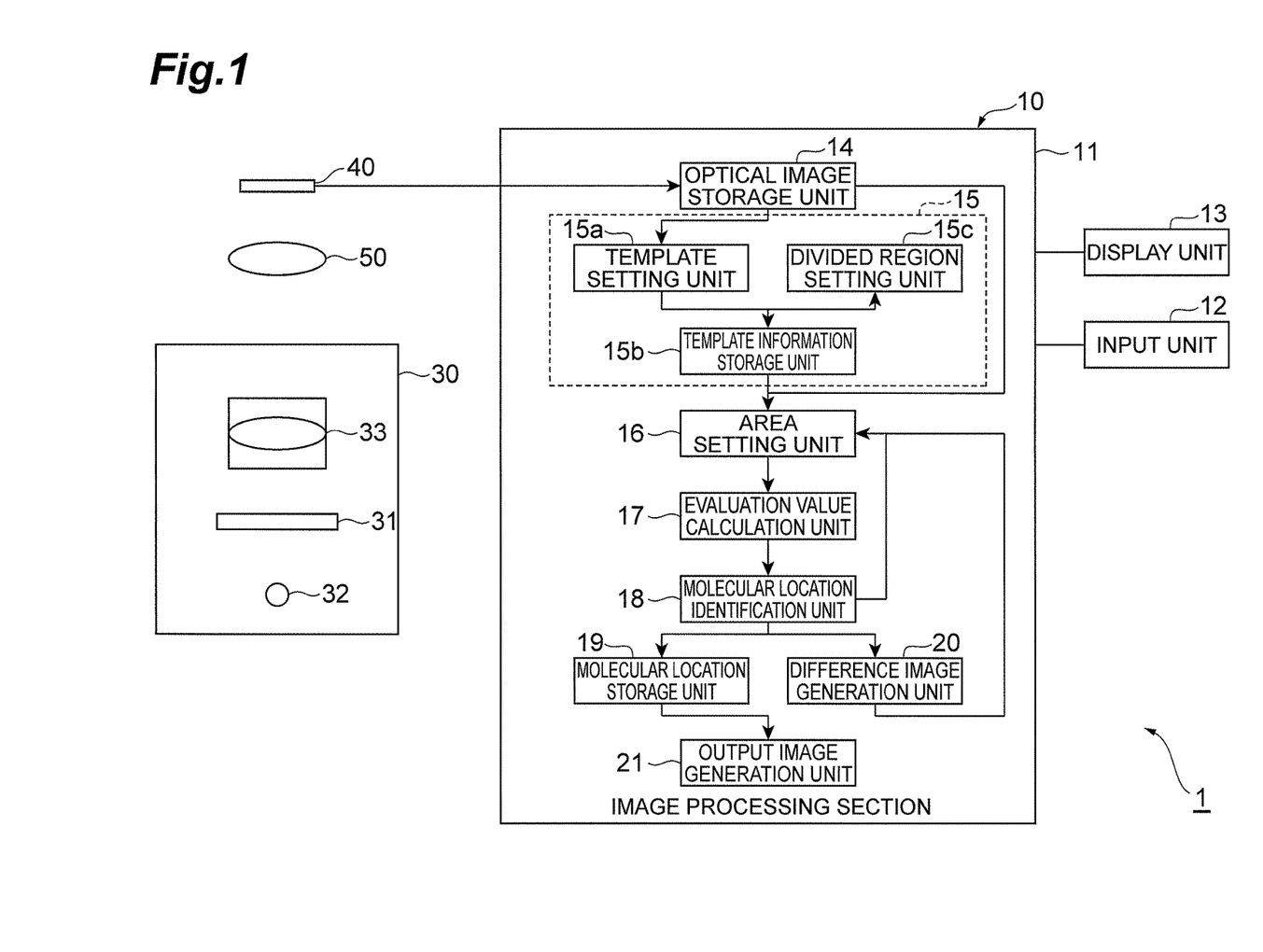
FIG. 1 is a schematic configuration diagram of a microscope device 1 according to a preferred embodiment of the present invention.

FIG. 1 is a schematic configuration diagram of a microscope device 1 according to a preferred embodiment of the present invention. The microscope device 1 shown in the same figure is a device for identifying the location of molecules such as fluorescent molecules or luminescent molecules in a sample such as living cells, and is constructed with an image processing device 10 for processing a two-dimensional pixel image picture obtained by imaging the sample, a microscope 30 for obtaining an optical image of the sample, a relay lens 50 for receiving an optical image obtained by the microscope 30, and an imaging element 40, such as a CMOS sensor or a CCD sensor, for taking an optical image of the sample focused by the relay lens 50 and generating an optical image (image picture).

The microscope 30 has a sample stage 31 on which a sample is placed, an illumination light source 32 for irradiating the sample with illumination light, and an objective lens 33 which is an optical system for observation of the sample. The relay lens 50 is disposed between the microscope 30 and the imaging element 40.

The image processing device 10 includes an image processing section 11 which is a data processor, such as a server device and a personal computer, provided with a CPU and for performing processing and control by software, an input unit 12 for inputting data to the image processing section 11 from the outside, and a display unit 13 such as a display for outputting data processed by the image processing section 11. The image processing section 11 includes, as functional components, an optical image storage unit 14, a template preparation unit (template preparing means) 15, an area setting unit 16, an evaluation value calculation unit (evaluation value calculating means) 17, a molecular location identification unit (molecular location identifying means) 18, a molecular location storage unit 19, a difference image generation unit 20, and an output image generation unit 21. Further, the template preparation unit 15 consists of a template setting unit 15a, a template information storage unit 15b, and a divided region setting unit 15c.

Hereinafter, the function of the components of the image processing section 11 will be described in detail.

Figure 2:
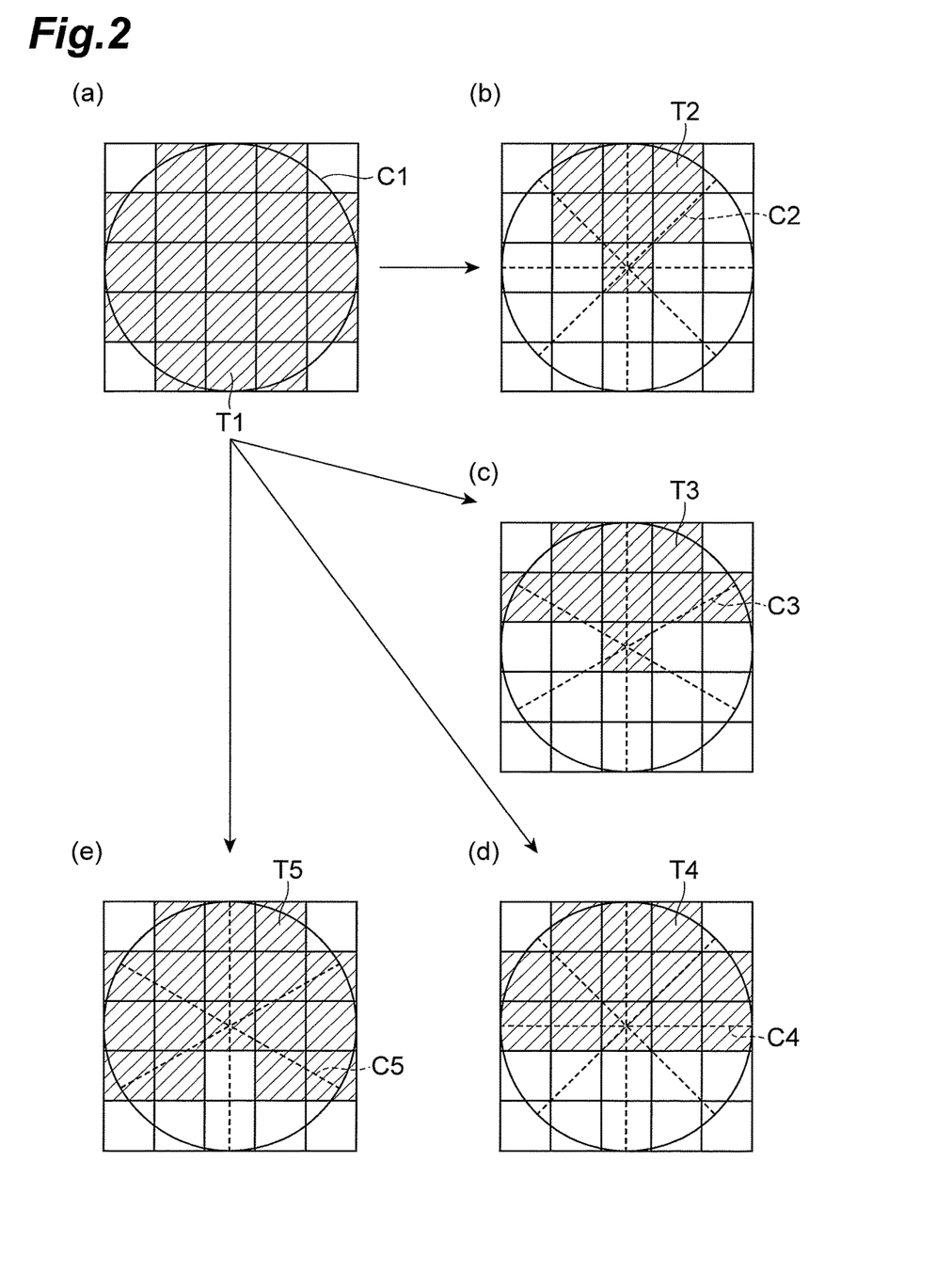
FIG. 2 are conceptual views showing examples of templates prepared by a template preparation unit 15 of FIG. 1.

The optical image storage unit 14 is an information storage means for temporarily storing an optical image generated by the imaging element 40. The template setting unit 15a reads out of the optical image storage unit 14 a single-molecule optical image obtained by the imaging element 40 based on a model sample containing a single fluorescent molecule, and prepares, from the single-molecule optical image, a template which is a two-dimensional image composed of pixels of M rows and M columns (M is an integer not less than 3) corresponding to a single-fluorescent-molecule model. Because single-molecule fluorescence generally has a two-dimensional Gaussian distribution, the template prepared by the template setting unit 15a results in image data of a luminance corresponding to a two-dimensional Gaussian distribution in a pixel region corresponding to a circular region or substantially circular region within the range of M rows and M columns. Such a circular region or substantially circular region corresponds to the shape of the single-fluorescent-molecule model. FIG. 2(a) shows a conceptual view showing an example of a template T1 prepared with 5 rows and 5 columns, and in the rectangular image of 5 rows and 5 columns in the same figure, the shaded part corresponding to a circular region C1 indicates being pixels for which significant values corresponding to a two-dimensional Gaussian distribution have been set as luminance values. The "pixel with a significant value" referred to here means a pixel that shows luminance, i.e. light emission, of a predetermined value (for example, a zero value) or more in terms of a luminance value. The template information storage unit 15b stores a template generated by the template setting unit 15a.

The divided region setting unit 15c reads a template generated by the template setting unit 15a out of the template information storage unit 15b, prepares partial templates for which the template is divided into a plurality of ratios defined in advance, and stores those partial templates in the template information storage unit 15b. When described in detail, the divided region setting unit 15c, when a template is generated corresponding to the circular region C1, based on the template, prepares a partial template as a pixel group corresponding to a fan shape having a predetermined central angle. Here, the predetermined central angle is a central angle with an angle of $\alpha \times 360°$ obtained by multiplying 360°, which is an central angle of the circular region C1 forming a template, by $\alpha$ ($\alpha$ is a number more than 0 and less than 1). The divided region setting unit 15c prepares a plurality of partial templates different in the value of $\alpha$. For example, as shown in FIGS. 2(b), (c), (d), and (e), the divided region setting unit 15c prepares partial templates T2, T3, T4, and T5 having pixels corresponding to fan-shaped regions C2, C3, C4, and C5 having central angles obtained by multiplying 360°, which is a central angle of the circular region C1, by ¼, ⅓, ½, and ⅔, respectively. The thus prepared partial templates T2, T3, T4, and T5 are set to ones corresponding to the fan-shaped regions C2, C3, C4, and C5 whose central angles are set to 90 degrees, 120 degrees, 180 degrees, and 240 degrees, respectively.

The area setting unit 16 reads an optical image of an object of a molecular location identification processing out of the optical image storage unit 14, and sets an object area of a template matching processing for the optical image. That is, the area setting unit 16 sets, corresponding to a pixel size of M rows and M columns being the size of a single-fluorescent-molecule model, a rectangular object area of 2×M rows and 2×M columns. Then, every time a template matching processing is repeated for one optical image, the area setting unit 16 changes object area in the optical image. For example, the area setting unit 16 sets the object area of 2×M rows and 2×M columns in the optical image by shifting by one pixel each time. In addition, the area setting unit 16 may set, as the object area of a template matching processing, an area corresponding to a circular region having a size of the single-fluorescent-molecule model, and may set the area with a size of $\beta \times M$ rows and $\beta \times M$ columns ($\beta$ is a number more than 1).

The evaluation value calculation unit 17 selects an attention pixel in the object area set by the area setting unit 16, and calculates, by use of a partial template corresponding to fan shapes rotated by a predetermined angle (angle larger than 0 degrees) each about the attention pixel, for every plurality of attention pixels included in the object area, an evaluation value for evaluating luminance matching between the optical image and the partial template. At this time, the evaluation value calculation unit 17 sets a using partial template based on a luminance level of the attention pixel. That is, the evaluation value calculation unit 17 selects the central angle of the region C2, C3, C4, or C5 corresponding to a partial template according to the luminance value of the attention pixel, and reads a partial template corresponding to the selected region C2, C3, C4, or C5 out of the template information storage unit 15b.

Figure 3:
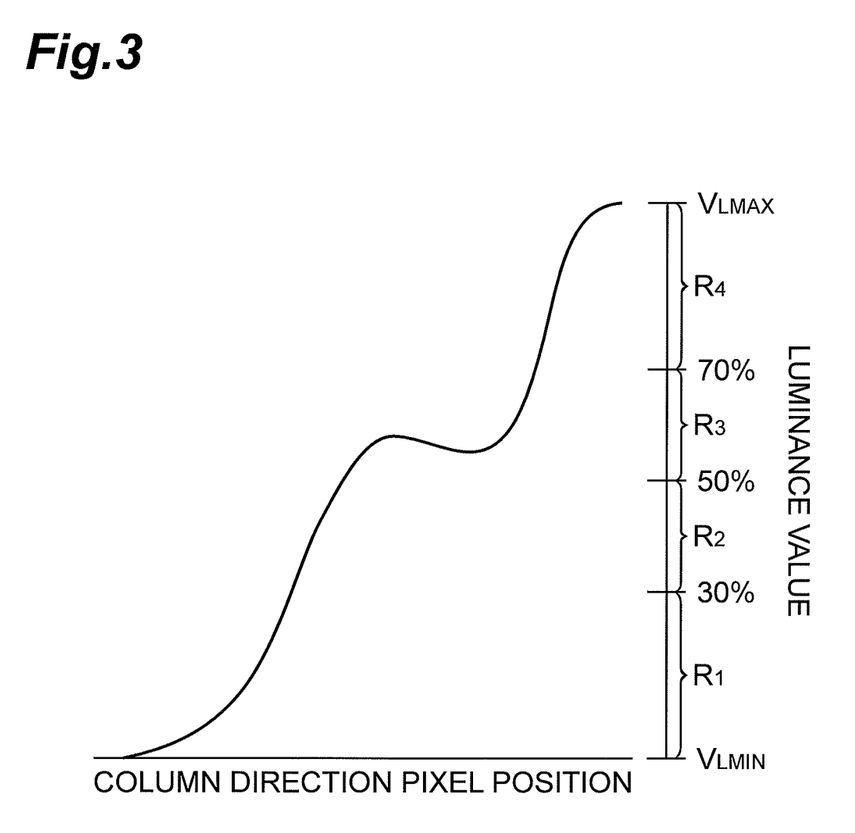
FIG. 3 is a graph showing an example of a distribution of luminance values in the column direction in an object area of an object for calculating an evaluation value by an evaluation value calculation unit 17 of FIG. 1.

FIG. 3 shows an example of a distribution of luminance values in the column direction in an object area of an object for calculating an evaluation value by the evaluation value calculation unit 17. When the luminance values in the object area are thus distributed from the minimum value $V_{LMIN}$ to the maximum value $V_{LMAX}$, the evaluation value calculation unit 17 selects the partial template T5 (FIG. 2(e)) whose central angle is 240 degrees for an attention pixel whose luminance value is in a range $R_1$ from the minimum value $V_{LMIN}$ to 30% between the minimum value $V_{LMIN}$ and the maximum value $V_{LMAX}$. The maximum value $V_{LMAX}$ is set to the maximum luminance determined after excluding 0.5% of highest luminance values from those of all pixels in the object area so as not to include a noise component. Moreover, the evaluation value calculation unit 17 selects the partial template T4 (FIG. 2(d)) whose central angle is 180 degrees for an attention pixel whose luminance value is in a range $R_2$ of 30% to 50% between the minimum value $V_{LMIN}$ and the maximum value $V_{LMAX}$. Moreover, the evaluation value calculation unit 17 selects the partial template T3 (FIG. 2(c)) whose central angle is 120 degrees for an attention pixel whose luminance value is in a range $R_3$ of 50% to 70% between the minimum value $V_{LMIN}$ and the maximum value $V_{LMAX}$. Further, the evaluation value calculation unit 17 selects the partial template T2 (FIG. 2(b)) whose central angle is 90 degrees for an attention pixel whose luminance value is in a range $R_4$ from 70% between the minimum value $V_{LMIN}$ and the maximum value $V_{LMAX}$ to the maximum value $V_{LMAX}$. The reason for thus setting the size of the central angle of the partial template according to the luminance value is as follows. That is, it is highly likely in a high-luminance location that molecules exist overlapping each other and a part to match a template is limited to be narrow, while it is unlikely in a low-luminance position that molecules exist overlapping each other and a part to match a template can be widely secured.

Figure 4:
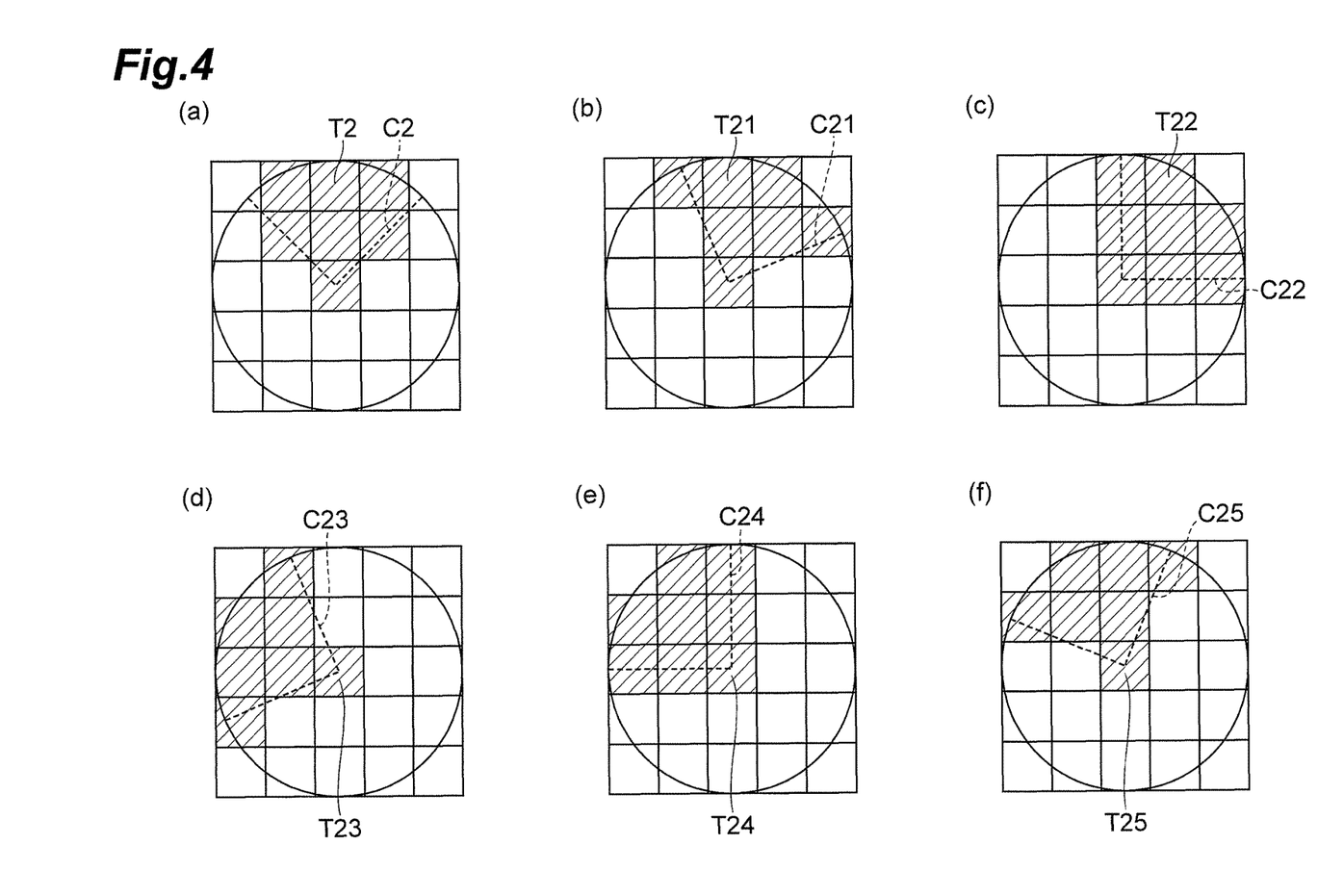
FIG. 4 are conceptual views showing examples of partial templates regenerated by the evaluation value calculation unit 17 of FIG. 1.

Then, the evaluation value calculation unit 17, when calculating an evaluation value by use of a selected partial template for attention pixels, overlays the partial template centered on the selected attention pixel, calculates the sum of squared differences (SSDs) in luminance between the pixels in the object area around the attention pixels and the partial template, and calculates as an evaluation value a value obtained by normalizing the sum of squared differences by the luminance of the attention pixel. Further, the evaluation value calculation unit 17 regenerates a partial template corresponding to shapes of the selected partial template rotated by a predetermined angle each, and calculates evaluation values in the same manner as the above by use of the regenerated partial template. When described in detail, the evaluation value calculation unit 17, when having selected the partial template T2 (FIG. 4(a)) corresponding to the fan-shaped region C2 whose central angle is 90 degrees, regenerates partial templates by rotating the partial template by steps of an angle (for example, 360 degrees/16 pixels=22.5 degrees in the case of a template of 5 rows and columns) of the partial template divided by the number of pixels in the circumferential direction. However, the angle steps by which the partial template is rotated is not limited to an angle obtained by dividing by the number of pixels in the circumferential direction, and may be arbitrary predetermined angle steps (for example, one degree each time) that are set in advance. FIGS. 4(b) to (f) show partial templates T21 to T25 regenerated corresponding to regions C21 to C25 obtained by rotating the fan-shaped region C2 about its center as a rotation center by 22.5 degrees, 45 degrees, 292.5 degrees, 315 degrees, and 337.5 degrees, respectively. Further, the evaluation value calculation unit 17 calculates evaluation values by use of the selected and regenerated plurality of partial templates, and then determines a value with the highest degree of matching, that is, the minimum calculated evaluation value, as an evaluation value of the attention pixels. In addition, the evaluation value calculation unit 17 may determine an average value of evaluation values calculated for the plurality of partial templates as an evaluation value of the attention pixels.

The molecular location identification unit 18 targets evaluation values calculated for a plurality of object areas included in the optical image to identify an evaluation value of a high degree of matching, and identifies the position of attention pixels having the identified evaluation value as a molecular location in the optical image. The identification of an evaluation value of a high degree of matching may be performed by comparison with a preset threshold, or may be by selecting an evaluation value of the highest degree of matching in the object area. Moreover, in the case of simultaneously identifying a plurality of molecular locations in the optical image, the molecular location identification unit 18 may select a plurality of molecular locations so that the distance between the molecular locations exceeds a predefined distance (for example, the size of one molecule). The molecular location identification unit stores the identified molecular location in the molecular location storage unit 19 every time of identification.

The difference image generation unit 20 excludes, from the optical image processed by the area setting unit 16, the evaluation value calculation unit 17, and the molecular location identification unit 18, with reference to the molecular location identified by the molecular location identification unit 18, the luminance value corresponding to a template corresponding to a single-fluorescent-molecule model. Specifically, the difference image generation unit 20, in the optical image, around a pixel corresponding to the molecular location, from the luminance value of each of the plurality of pixels corresponding to a template, subtracts the luminance value at a corresponding position in the template arranged centered on the molecular location. The difference image generation unit 20 outputs the optical image subjected to subtraction processing to the area setting unit 16, and causes the template matching processing and molecular location identification processing for the optical image to be repeated.

The output image generation unit 21 generates a super-resolution image which is an output image indicating a molecular location stored in the molecular location storage unit 19, and outputs the image to the display unit 13. The super-resolution image may be output superimposed on an optical image stored in the optical image storage unit 14, or may be output as a sole image indicating a molecular location.

Figure 5:
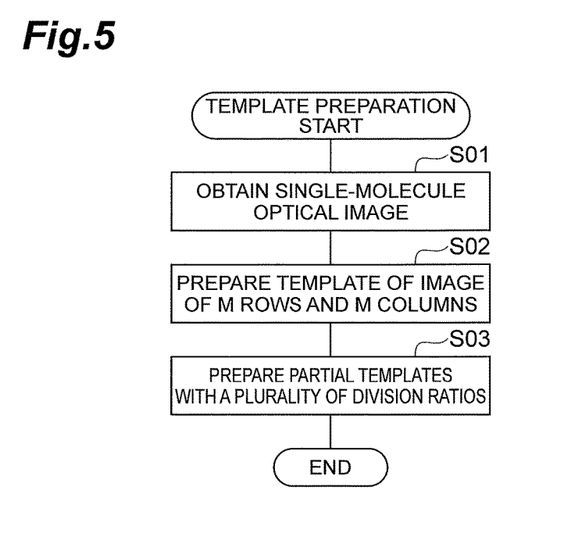
FIG. 5 is a flowchart showing the operation of a template preparation processing by an image processing device 10 of FIG. 1.
Figure 6:
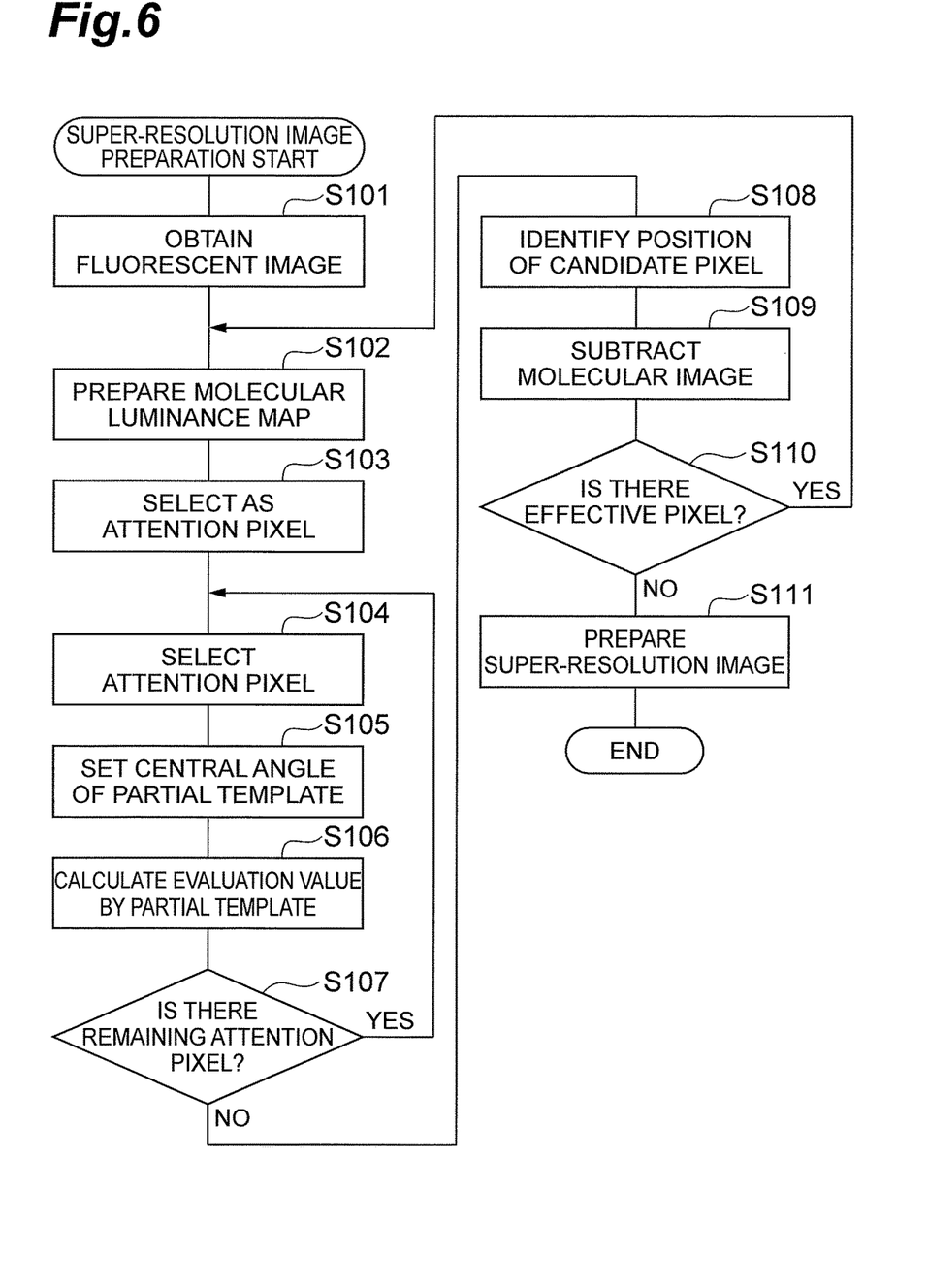
FIG. 6 is a flowchart showing the operation of a super-resolution image preparation processing by the image processing device 10 of FIG. 1.
Figure 7:
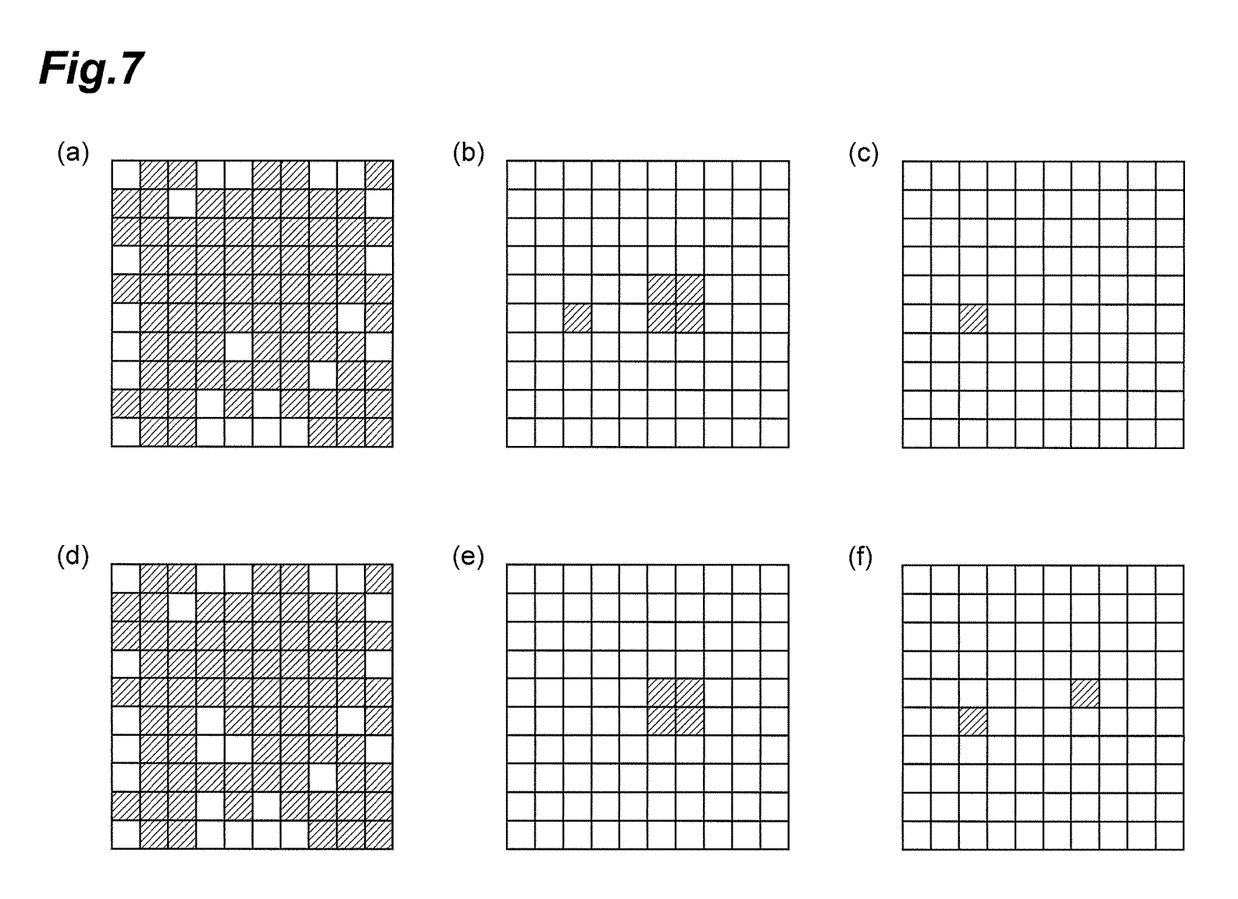
FIG. 7 are views showing image pictures of object areas to be processed by the image processing device 10 of FIG. 1.

Hereinafter, the operation of the image processing device 10 will be described, while an image processing method according to the present embodiment will be explained in detail. FIG. 5 is a flowchart showing the operation of a template preparation processing by the image processing device 10. FIG. 6 is a flowchart showing the operation of a super-resolution image preparation processing by the image processing device 10. FIG. 7 are views showing image pictures of object areas to be processed by the image processing device 10.

Referring to FIG. 5, when preparing a super-resolution image from an optical image of a sample of a processing object, a template preparation processing is executed in advance by the image processing device 10 prior thereto. First, a single-molecule optical image is obtained by the imaging element 40 based on a model sample containing a single fluorescent molecule, and the obtained single-molecule optical image is stored in the optical image storage unit 14 (step S01). Next, by the template setting unit 15a, the single-molecule optical image is read out of the optical image storage unit 14, and a template which is a two-dimensional image of M rows and M columns (M is an integer not less than 3) is prepared from the single-molecule optical image (step S02). The prepared template is stored in the template information storage unit 15b. Further, by the divided region setting unit 15c, a partial template which is a pixel group corresponding to a fan shape having a predetermined central angle (α (α is a number more than 0 and less than 1)×360°) is prepared from the template (step S03).

The partial template is prepared as a plurality of partial templates different in central angles, and the prepared plurality of partial templates are stored in the template information storage unit 15b.

Referring to FIG. 6, after completion of the above-described template preparation processing, a super-resolution image preparation processing for preparing a super-resolution image from an optical image of a sample of a processing object is started by the image processing device 10. When described in detail, first, an optical image is obtained by the imaging element 40 based on an object sample, and the obtained optical image is stored in the optical image storage unit 14 (step S101). Then, by the area setting unit 16, an object area (FIG. 7(a)) of β×M rows and β×M columns (β is a number more than 1) is set in plural numbers in the optical image, and an object area-based molecular luminance map is prepared (step S102). The molecular luminance map is prepared as data for which a total of luminance values of a single-molecule region (single-molecule-sized square region) around each pixel in the object area is mapped onto each pixel. Then, by the area setting unit 16, based on the molecular luminance map, a pixel having a total of luminance values not less than a preset threshold is selected as an attention pixel (step S103, FIG. 7(b)). For example, by the area setting unit 16, the pixels shown by shading in FIG. 7(b) are selected by being narrowed down as attention pixels.

Further, by the evaluation value calculation unit 17, one of the narrowed down attention pixels is selected (step S104). Next, by the evaluation value calculation unit 17, the central angle of a partial template to be used for an evaluation value calculation is set according to the luminance value of the attention pixel, and a partial template corresponding to the set central angle is read out of the template information storage unit 15b (step S105). Then, by the evaluation value calculation unit 17, an evaluation value of the attention pixels is calculated by using the read-out partial template (step S106). Further, by the evaluation value calculation unit 17, whether an attention pixel of an object for calculating an evaluation value remains is determined (step S107). As a result of determination, when there is a remaining attention pixel (step S107; YES), the process is returned to step S104 to repeat the setting of a partial template and the calculation of an evaluation value. On the other hand, when there is not a remaining attention pixel (step S107; NO), by the molecular location identification unit 18, the position of a candidate pixel being a candidate for a molecular location is identified (step S108, FIG. 7(c)). For example, by the molecular location identification unit 18, the position of the pixel shown by shading in FIG. 7(c) is identified as a candidate pixel.

Next, by the difference image generation unit 20, with reference to the molecular location identified by the molecular location identification unit 18, the template corresponding to a molecular image of a single-fluorescent-molecule model is subtracted from the optical image (step S109, FIG. 7(d)). Further, by the difference image generation unit 20, whether there is a pixel (effective pixel) having a significant value in the optical image after subtraction is determined (step S110). As a result, when it is determined that there is an effective pixel (step S110; YES), the process is returned to step S102 to repeat the attention pixel narrowing-down processing and the molecular location identification processing for the optical image after subtraction (FIGS. 7(e) and (f)). On the other hand, when it is determined that there is not an effective pixel (step S110; NO), the molecular location identification processing is completed, and by the output image generation unit 21, a super-resolution image is generated and output based on the candidate pixel(s) having been identified so far (step S111).

Hereinafter, an image processing program for causing a computer to operate as the image processing device 10 will be described.

The image processing program according to the embodiment of the present invention is provided, stored in a recording medium. As the recording medium, a recording medium such as a floppy (registered trademark) disk, a CD-ROM, a DVD, or a ROM, a semiconductor memory, or the like is exemplified.

Figure 8:
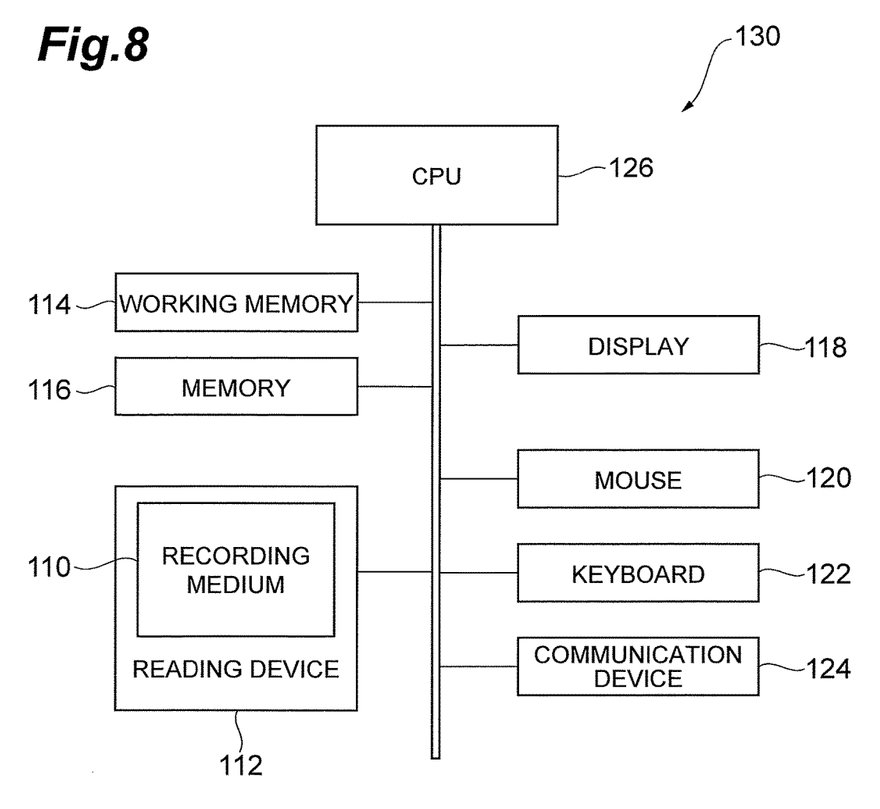
FIG. 8 is a diagram showing a hardware configuration of a computer for executing a program stored in a recording medium.
Figure 9:
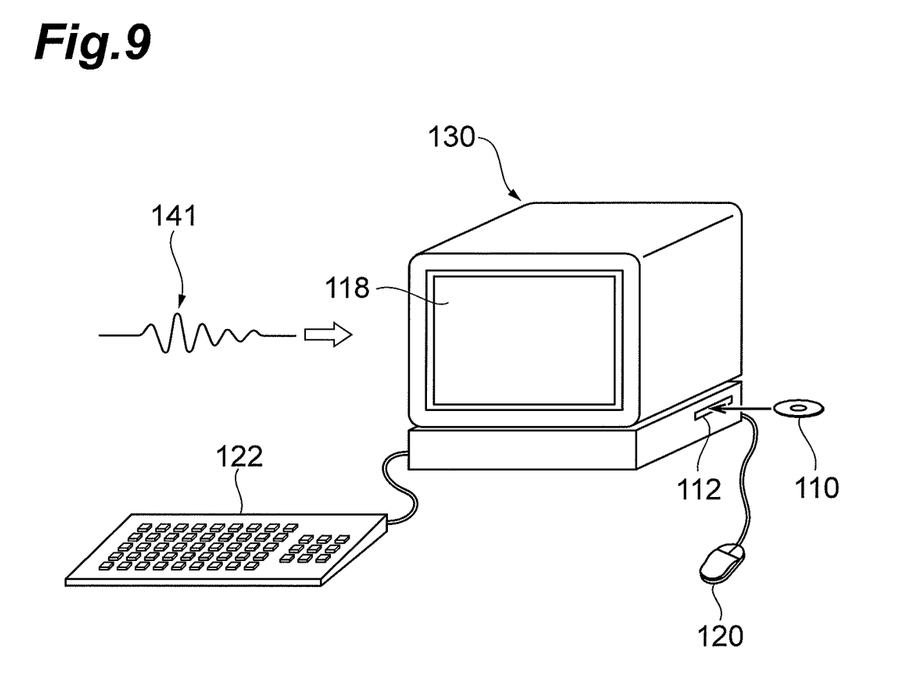
FIG. 9 is a perspective view of the computer for executing a program stored in a recording medium.

FIG. 8 is a diagram showing a hardware configuration of a computer for executing a program stored in a recording medium, and FIG. 9 is a perspective view of the computer for executing a program stored in a recording medium. Examples of the computer include various data processors, such as server devices and personal computers, provided with CPUs and for performing processing and control by software.

As shown in FIG. 8, the computer 130 includes a reading device 112 such as a floppy (registered trademark) disk drive device, a CD-ROM drive device, or a DVD drive device, a working memory (RAM) 114 in which an operating system is resident, a memory 116 for storing a program stored in a recording medium 110, a display device 118 such as a display, a mouse 120 and a keyboard 122 being an input device, a communication device 124 for performing transmission and reception of data etc., and a CPU 126 for controlling execution of a program. The computer 130, when the recording medium 110 is inserted in the reading device 112, can access an image processing program stored in the recording medium 110 through the reading device 112, and is enabled by said image processing program to operate as the image processing device 10 of the present embodiment.

As shown in FIG. 9, the image processing program may be provided over a network as a computer data signal 141 superimposed on a carrier. In this case, the computer 130 can store an image processing program received by the communication device 124 in the memory 116, and execute said image processing program.

According to the microscope device 1 described above, a partial template divided from a template included in pixels of M rows and M columns is prepared, and by use of a partial template corresponding to a shape rotated about an attention pixel selected from an optical image of an object sample, matching between the partial template and optical image is evaluated, and a molecular location is identified based on the obtained evaluation value. Accordingly, a molecular image distributed about an attention pixel can be identified with high accuracy by matching the molecular image with a template in a divided pixel region even when a part of the molecular image overlaps another molecular image. Specifically, an image having a shape corresponding to a circular image is generated as a template, an image corresponding to a fan shape is generated from the circular image as a partial template, and the degree of matching is evaluated by means of the partial template that easily fits into an edge portion of a molecular image, and thus the central position of a molecule can be identified with a higher accuracy even for an optical image where a plurality of molecular images are overlapping. That is, by using the partial template corresponding to a fan shape, an edge portion of a single molecule can be found out with high accuracy to identify based thereon the central position of the molecule.

Moreover, it is preferable for the partial template to have pixels corresponding to a fan shape having a central angle for which a central angle of the template is multiplied by $\alpha$ ($\alpha$ is a number less than 1 and more than 0). Accordingly, when the template is circular or substantially circular, a partial template having an appropriate shape can be prepared.

Moreover, it is preferable for the partial template to be prepared as a plurality of partial templates different in central angles. Accordingly, different partial templates can be used according to the situation.

Moreover, because the central angle of a partial template is selected corresponding to the pixel value of an attention pixel of an object for evaluating matching by the evaluation value calculation unit 17, as a result of the division ratio of a partial template being adjusted according to the degree of overlapping of a plurality of molecules in an optical image, matching between a molecular image and a partial template can be appropriately evaluated. Consequently, a molecular location can be identified with high accuracy.

It is preferable, when the evaluation value calculation unit 17 calculates an evaluation value by use of a partial template corresponding to shapes rotated by a predetermined angle each about a selected attention pixel, that the predetermined angle is an angle obtained by dividing by the number of pixels in the circumferential direction of a pixel group of M rows and M columns corresponding to a template. At this time, the number of pixels in the circumferential direction of a pixel group of M rows and M columns is 4×M-4 pixels. Accordingly, overlapping of the partial templates can be reduced, and a calculation of an evaluation value can be efficiently performed.

Moreover, because an attention pixel is selected out of the pixels included in an optical image based on the pixel values by the evaluation value calculation unit 17, a processing for calculating an evaluation value and identifying a molecular location is performed for only the attention pixels with a high probability that a molecule exists. As a result, the processing load of the device can be reduced and a molecular location is identified with high accuracy.

It is more preferable that an object area to be evaluated by the evaluation value calculation unit 17 is $\beta \times M$ rows and $\beta \times M$ columns ($\beta$ is a number more than 1) when a template of M rows and M columns is used. Even when a plurality of attention pixels having high evaluation values exist in a narrow range, a molecular location can be identified with high accuracy.

In addition, the present invention is not limited to the embodiment mentioned above. For example, the image processing device 10 may form an imaging device such as a camera unit integrated with the imaging element 40.

Moreover, when a template and a partial template are prepared by the template setting unit 15*a* and the divided region setting unit 15*c*, these may be prepared based on various parameters such as a central angle input from the outside by the input unit 12, and a luminance range for determining a central angle of the partial template.

Figure 10:
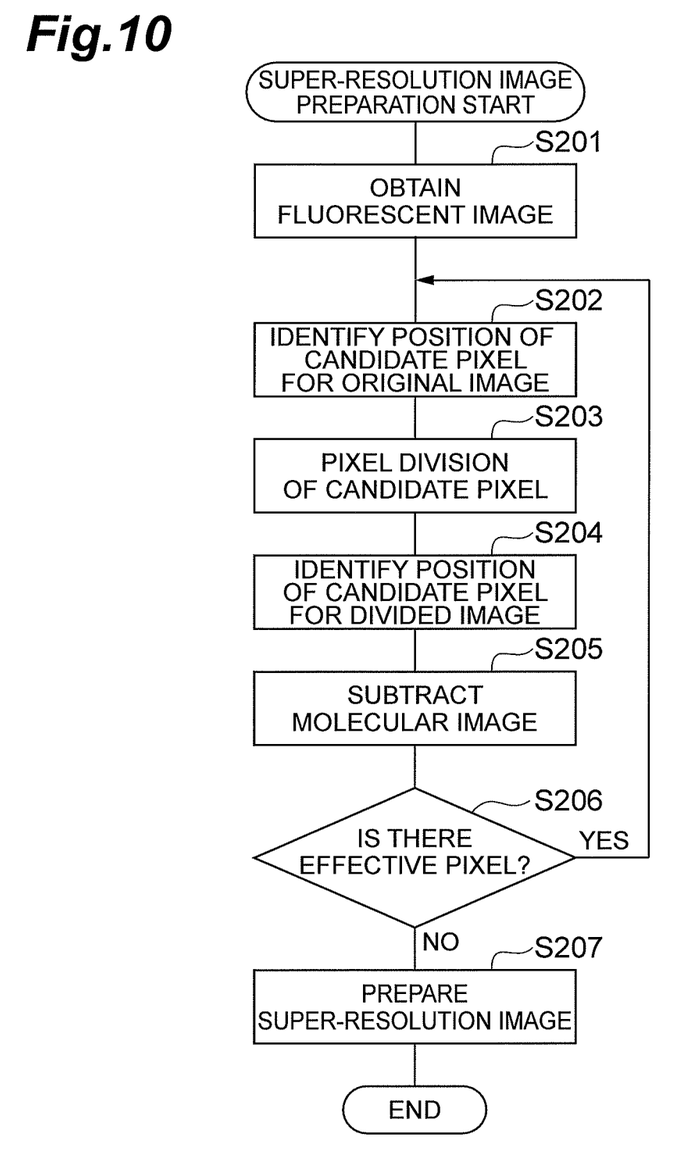
FIG. 10 is a flowchart showing the operation of a super-resolution image preparation processing by the image processing device 10 according to a modification of the present invention.

Moreover, after identifying a molecular location for an optical image by the image processing section 11, a molecular location may be re-identified for pixels for which a candidate pixel corresponding to a molecular location is divided into a plurality of divided regions. FIG. 10 is a flowchart showing the procedure for a super-resolution image preparation processing by the image processing section 11 in this case.

As shown in the same figure, when the super-resolution image preparation processing is started, in the same manner as in step S101 to step S108 of FIG. 6, the position of a candidate pixel in an optical image is identified (step S201, step S202). Next, each pixel of the optical image is divided into sub-pixels (divided regions) of 10 rows and 10 columns by the area setting unit 16 (step S203). Then, for the sub-pixels included in the candidate pixel in the divided optical image, in the same manner as in step S102 to step S108, evaluation values are calculated, a detailed position of the candidate pixel is identified in sub-pixels based on the evaluation values (step S204). Here, as a template and partial template to be used, ones re-prepared corresponding to the resolution of the divided optical image and the size of a single-fluorescent-molecule model are used. Then, by the difference image generation unit 20, the template corresponding to the single-fluorescent-molecule model is subtracted from the optical image with reference to the position of the candidate pixel identified (step S205). Further, by the difference image generation unit 20, whether there is an effective pixel in the optical image after subtraction is determined (step S206). As a result, when it is determined that there is an effective pixel (step S206; YES), the process is returned to step S202 to repeat the molecular location identification processing for the non-divided and divided optical images after subtraction. On the other hand, when it is determined that there is not an effective pixel (step S206; NO), the molecular location identification processing is completed, and by the output image generation unit 21, a super-resolution image is generated and output based on the candidate pixel(s) having been identified so far (step S207). According to such a super-resolution image preparation processing, a molecular location in the optical image can be identified in greater detail.

Moreover, as the optical image of a processing object of the image processing device 10, an original image obtained by the imaging element 40 may be used, and an optical image for which the resolution of an original image is degraded by downsampling may be used when the resolution of the original image is relatively high.

Moreover, the image processing device 10 may set an object area after calculating an evaluation value by performing template matching to attention pixels in the optical image, and identify a pixel with the highest degree of matching in the object area as a molecule location.

That is, the evaluation value calculation unit 17 selects an attention pixel out of a plurality of pixels composing an optical image, and calculates, by use of a partial template corresponding to fan shapes rotated by a predetermined angle (angle larger than 0 degrees) each about the attention pixel, an evaluation value for evaluating luminance matching between the optical image and the partial template. The evaluation value calculation unit 17 calculates a comparative evaluation value of the selected attention pixel based on a plurality of calculated evaluation values.

Then, the molecular location identification unit 18 stores as a molecular location the position of an attention pixel where the degree of matching indicated by a comparative evaluation value is the highest out of a plurality of attention pixels in the object area set by the area setting unit 16. Accordingly, even when attention pixels with high degrees of matching are close, a molecular location can be identified with high accuracy.

Here, it is also preferable that the template has pixels corresponding to a circular image, and the partial template has pixels corresponding to a fan shape having a central angle for which a central angle of the circular image is multiplied by α (α is a number less than 1 and more than 0). In this case, as a result of the degree of matching being evaluated by means of the partial template that easily fits into an edge portion of a molecular image, the central position of a molecule can be identified with a higher accuracy.

Moreover, it is preferable that the evaluation value calculating means selects the predetermined ratio corresponding to the partial template, corresponding to a pixel value of the attention pixel of an object for evaluating the matching. By including such an evaluation value calculating means, the division ratio of a partial template is adjusted according to the degree of overlapping of a plurality of molecules, so that matching between a molecular image and a partial template can be appropriately evaluated. Consequently, a molecular location can be identified with high accuracy.

Further, it is also preferable that the evaluation value calculating means selects, out of pixels included in the image picture, the attention pixel of an object for calculating the evaluation value based on pixel values of the pixels. By having such a constitution, a processing for calculating an evaluation value and identifying a molecular location is performed for only the attention pixels with a high probability that a molecule exists, so that the processing load of the device can be reduced and a molecular location is identified with high accuracy.

Still further, it is also preferable that the evaluation value calculating means divides the attention pixel identified as the molecular location by the molecular location identifying means into a plurality of divided regions, and recalculates the evaluation value for every plurality of divided regions by use of the partial template, and the molecular location identifying means re-identifies the molecular location in the image picture based on the evaluation value calculated for the plurality of divided regions in the attention pixel. According to such a constitution, a molecular location in the image picture can be identified in greater detail.

What is claimed is:

1. An image processing device for identifying a molecular location based on an image picture of a sample, comprising:
    a memory configured to store at least one image picture captured by a camera, the image picture including a plurality of pixels;
    a processor communicatively coupled to the memory, the processor configured to:
    prepare a template corresponding to a molecular model, the template being a two-dimensional image;
    prepare a plurality of partial templates from the template, wherein each partial template corresponds to a circular sector shape having a central angle;
    obtain the image picture;
    select at least one pixel out of the pixels included in the image picture for which an evaluation value is to be calculated;
    set a central angle of a partial template based on a luminance value of the selected pixel;
    select a partial template out of the prepared plurality of partial templates according to the set central angle;
    calculate an evaluation value of the selected pixel using the selected partial template; and
    identify the molecular location in the image picture based on the calculated evaluation value,
    wherein the processor is configured to set at small central angle of the selected partial template when the luminance value of the selected pixel is high;
    wherein the processor is configured to set the central angle of the selected partial template to a value of about 90° when the luminance value of the selected pixel is in a range from about (1) 70% of a difference between a maximum luminance value and a minimum luminance value to (ii) the maximum luminance value;

wherein the maximum luminance value is a maximum luminance value among the pixels included in the image picture; and wherein the minimum luminance value is a minimum luminance value among the pixels included in the image picture.

2. An image processing device for identifying a molecular location based on an image picture of a sample, comprising:
a memory configured to store at least one image picture captured by a camera, the image picture including a plurality of pixels;
a processor communicatively coupled to the memory, the processor configured to:
prepare a template corresponding to a molecular model, the template being a two-dimensional image;
prepare a plurality of partial templates from the template, wherein each partial template corresponds to a circular sector shape having a central angle;
obtain the image picture;
select at least one pixel out of the pixels included in the image picture for which an evaluation value is to be calculated;
set a central angle of a partial template based on a luminance value of the selected pixel;
select a partial template out of the prepared plurality of partial templates according to the set central angle;
calculate an evaluation value of the selected pixel using the selected partial template; and
identify the molecular location in the image picture based on the calculated evaluation value,
wherein the processor is configured to set at small central angle of the selected partial template when the luminance value of the selected pixel is high;
wherein the processor is configured to set the central angle of the selected partial template to a value of about 120° when the luminance value of the selected pixel is in a range from about 50% to about 70% of a difference between a maximum luminance value and a minimum luminance value;
wherein the maximum luminance value is a maximum luminance value among the pixels included in the image picture; and
wherein the minimum luminance value is a minimum luminance value among the pixels included in the image picture.

3. An image processing device for identifying a molecular location based on an image picture of a sample, comprising:
a memory configured to store at least one image picture captured by a camera, the image picture including a plurality of pixels;
a processor communicatively coupled to the memory, the processor configured to:
prepare a template corresponding to a molecular model, the template being a two-dimensional image;
prepare a plurality of partial templates from the template, wherein each partial template corresponds to a circular sector shape having a central angle;
obtain the image picture;
select at least one pixel out of the pixels included in the image picture for which an evaluation value is to be calculated;
set a central angle of a partial template based on a luminance value of the selected pixel;
select a partial template out of the prepared plurality of partial templates according to the set central angle;
calculate an evaluation value of the selected pixel using the selected partial template; and
identify the molecular location in the image picture based on the calculated evaluation value,
wherein the processor is configured to set at small central angle of the selected partial template when the luminance value of the selected pixel is high;
wherein the processor is configured to set the central angle of the selected partial template to a value of about 180° when the luminance value of the selected pixel is in a range from about 30% to about 50% of a difference between a maximum luminance value and a minimum luminance value;
wherein the maximum luminance value is a maximum luminance value among the pixels included in the image picture; and
wherein the minimum luminance value is a minimum luminance value among the pixels included in the image picture.

4. An image processing device for identifying a molecular location based on an image picture of a sample, comprising:
a memory configured to store at least one image picture captured by a camera, the image picture including a plurality of pixels;
a processor communicatively coupled to the memory, the processor configured to:
prepare a template corresponding to a molecular model, the template being a two-dimensional image;
prepare a plurality of partial templates from the template, wherein each partial template corresponds to a circular sector shape having a central angle;
obtain the image picture;
select at least one pixel out of the pixels included in the image picture for which an evaluation value is to be calculated;
set a central angle of a partial template based on a luminance value of the selected pixel;
select a partial template out of the prepared plurality of partial templates according to the set central angle;
calculate an evaluation value of the selected pixel using the selected partial template; and
identify the molecular location in the image picture based on the calculated evaluation value,
wherein the processor is configured to set at small central angle of the selected partial template when the luminance value of the selected pixel is high;
wherein the processor is configured to set the central angle of the selected partial template to a value of about 240° when the luminance value of the selected pixel is in a range from (i) a minimum luminance value to (ii) about 30% of a difference between a maximum luminance value and the minimum luminance value;
wherein the maximum luminance value is a maximum luminance value among the pixels included in the image picture; and
wherein the minimum luminance value is a minimum luminance value among the pixels included in the image picture.

* * * * *